(12) United States Patent
Dai et al.

(10) Patent No.: US 7,043,199 B2
(45) Date of Patent: May 9, 2006

(54) UPLINK POWER CONTROL SYSTEM FOR SATELLITE COMMUNICATION SYSTEM EMPLOYING ON-BOARD SATELLITE PROCESSING AND FADE ESTIMATION

(75) Inventors: Jerry Dai, Germantown, MD (US); Stan Kay, Rockville, MD (US); Yezdi Antia, Gaithersburg, MD (US); Zhenliang Shi, Germantown, MD (US); Anwer Khan, Gaithersburg, MD (US); Gaguk Zakaria, Hyattsville, MD (US)

(73) Assignee: Hughes Network Systems LLC, Germantown, MD (US)

( * ) Notice: Subject to any disclaimer, the term of this patent is extended or adjusted under 35 U.S.C. 154(b) by 781 days.

(21) Appl. No.: 09/875,607

(22) Filed: Jun. 6, 2001

(65) Prior Publication Data

US 2003/0040274 A1 Feb. 27, 2003

(51) Int. Cl.
*H04B 7/185* (2006.01)
(52) U.S. Cl. .............. 455/13.4; 455/12.1; 455/134; 455/522
(58) Field of Classification Search ........... 455/427, 455/13.4, 12.1, 522, 134, 135, 136
See application file for complete search history.

(56) References Cited

U.S. PATENT DOCUMENTS

| 4,422,171 A | 12/1983 | Wortley et al. |
|---|---|---|
| 5,708,966 A * | 1/1998 | Al-Dhahir et al. ......... 455/13.4 |
| 6,085,067 A | 7/2000 | Gallagher et al. |
| 6,101,385 A | 8/2000 | Monte et al. |
| 6,212,360 B1 | 4/2001 | Fleming, III et al. |
| 6,240,124 B1 | 5/2001 | Wiedeman et al. |
| 6,272,325 B1 | 8/2001 | Wiedeman et al. |
| 6,321,065 B1 | 11/2001 | Wilcoxson et al. |
| 6,334,047 B1 | 12/2001 | Andersson et al. |
| 6,430,418 B1 | 8/2002 | Nivens et al. |

FOREIGN PATENT DOCUMENTS

| CA | 2 238 776 | 11/2001 |
|---|---|---|
| EP | 0 837 569 A2 | 10/1997 |
| EP | 0 969 607 A2 | 6/1999 |
| WO | WO 98/09387 | 5/1998 |
| WO | WO 99/21291 | 4/1999 |

* cited by examiner

*Primary Examiner*—Bing Q. Bui
(74) *Attorney, Agent, or Firm*—Craig Plastrik

(57) ABSTRACT

An uplink power control system for terminals in a satellite communication system provides closed loop power control using feedback signals generated at a satellite. The satellite performs inter-beam routing of uplink signals from satellite terminals, and processing of uplink signals to generate terminal transmission-specific feedback information that is transmitted in downlink signals to the terminals. The satellite also generates a beacon signal. An uplink power control algorithm at each terminal uses the beacon signal and feedback data to adjust transmit power.

4 Claims, 9 Drawing Sheets

- STF: SYSTEM TRACKING FILTER
- FTF: FREQUENCY TABLE FILTER (i=0, ... M-1)
- CNTF: C/N TABLE FILTER (j=0, ... N-1)

UPLINK POWER CONTROL SYSTEM FOR SATELLITE COMMUNICATION SYSTEM EMPLOYING ON-BOARD SATELLITE PROCESSING AND FADE ESTIMATION

FIELD OF THE INVENTION

The invention relates to an uplink power control system and more particularly to an uplink power control system employing fade estimation, on-board processing and feedback signaling, and autonomous transmit power adjustment per carrier frequency at terminals.

BACKGROUND OF THE INVENTION

A number of existing uplink power control systems for satellite communication systems employ open loop power control and therefore provide no feedback to terminals or stations in the communication system regarding power levels of signals received at a satellite following transmission from the terminals or stations. Other uplink power control systems such as those described in U.S. Pat. Nos. 5,619,525 and 6,097,752 employ closed loop power control; however, the satellites are repeaters and do not generate feedback data based on received signals from terminals. In other words, these systems are bent-pipe systems whereby the satellite does not impart intelligence to the power control loops (e.g., a loop between a terminal and a satellite repeater and loop between a ground station and a satellite repeater) employed by the closed loop power system.

Existing systems do not allow stations or terminals to estimate fade sufficiently to allow for transmit power adjustment that achieves the signal quality (e.g., as measured by packet loss rates) desired when rendering broadband, multimedia satellite services such as Fixed Satellite Services (FSS) operating in the 30/20 GHz Ka-band spectrum. Ka-band transmission is affected greatly by environmental conditions such as rain, cloud cover, scintillation and interference. Accordingly, a need exists for an uplink power control system that can maintain a desired level of signal quality at the satellite in view of atmospheric fading and variation attributable to Ka-band transmission, external interference and transmission delay.

SUMMARY OF THE INVENTION

The above described disadvantages are overcome and a number of advantages are realized by an uplink power control (ULPC) system that employs an ULPC algorithm at each terminal to adjust the transmit power per carrier frequency for that terminal and therefore autonomously with respect to other terminals.

In accordance with an aspect of the present invention, the ULPC algorithm of the present invention receives feedback information generated on-board the satellite. The satellite is operable to perform a number of noise and signal-to-noise measurements and signal-to-noise and interference measurements using received uplink signals from terminals and to generate a status packet having information for each terminal relating to its recent uplink signal transmission on a particular channel. The ULPC algorithm uses the status packet when determining transmit power for its corresponding terminal when transmitting on that particular channel.

In accordance with yet another aspect of the present invention, ULPC system of the present invention employs an essentially constant power beacon signal generated by the satellite and cell cast periodically to terminals. The ULPC algorithm at each terminal derives carrier-to-noise data relating to the beacon signal that is used to estimate the downlink fade and facilitate adjustment of terminal transmit power.

In accordance with still yet another aspect of the present invention, the ULPC algorithm maintains and updates filter tables using feedback data generated by the satellite. The tables relate to system variations such as the terminal temperature variation and satellite gain-to-temperature variation, estimated uplink spectrum shape and fade estimation and are used to select terminal transmit power.

BRIEF DESCRIPTION OF DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

1. System Overview

Figure 1:
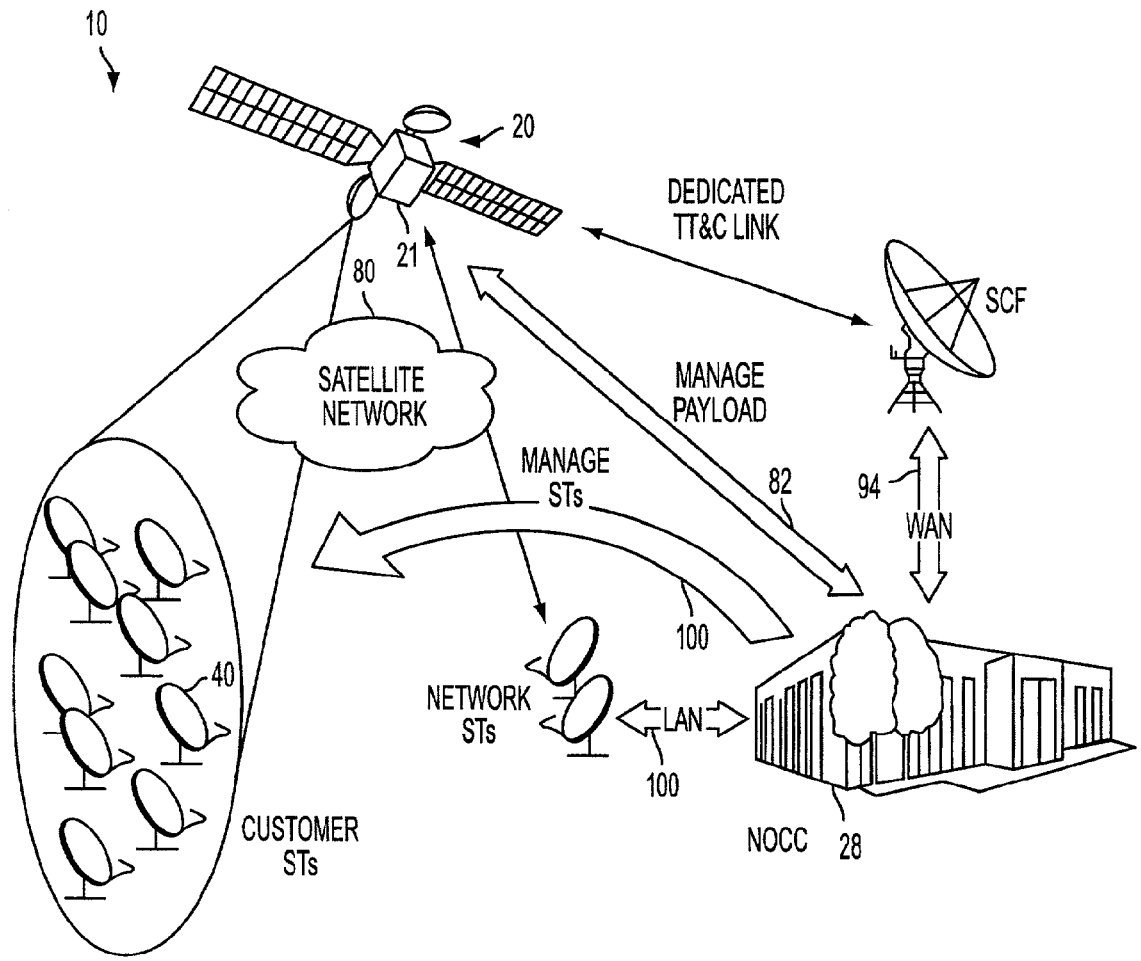
FIG. 1 illustrates a satellite communication system in accordance with an embodiment of the present invention.

An illustrative broadband multimedia satellite system 10 constructed in accordance with the present invention is depicted in FIG. 1. The system is described in the above-referenced, commonly assigned, copending patent applications that are incorporated herein by reference. The payload 21 on-board the satellite 20 in the system 10 performs inter-beam routing among satellite terminals (STs) 40 in different cells. The satellite provides for flexible allocation of its demodulator resources among uplink cells and can transmit packets from terminals to one or more terminals in one or more downlink cells using different delivery options such as point-to-point service, cellcasts, multicasts and broadcasts. The uplink preferably uses a frequency division multiple access/time division multiple access or FDMA TDMA signal format. Thus, STs are assigned frequencies and time slots in signal frames at which to transmit signals.

The system 10 supports different data rates and different types of connections. Data rates that can be supported on a single carrier can be, for example, 16.384 Mbps (8E1), 2.048 Mbps (E1) and 512 kbps (E1/4). Lower rates are used when STs enter a fallback mode described below. Different connection services include, but are not limited to, connectionless and connection-oriented calls. For a connection-oriented call, an ST 40 communicates with a network operations control center (NOCC) 28 to receive tokens with which to request uplink bandwidth from the payload. In this connection mode, the NOCC 28 can determine if sufficient bandwidth is available to meet terminal requests for rate or volume traffic. For a connectionless call, an ST 40 communicates with the satellite payload 21 directly without first obtaining authorization from the NOCC 28. The ST first sends a contention channel request to the payload 21 for uplink bandwidth. The payload, in turn, sends an assignment to the terminal, as well as a power measurement, to allow the ST to adjust uplink power. Regardless of the connection mode used, the payload 21 receives packet segments from the STs 40 via uplink signals, validates signatures provided therein, schedules packets for downlink transmission and then transmits them.

2. Uplink Power Control

Ka band transmission is affected greatly by the environment. The major factors are the rain, cloud, scintillation and interference. The present invention provides the system 10 with an uplink power control (ULPC) system 50 which is specifically designed to compensate for the transmission environment.

The major portions of the ULPC system 50 are distributed between the satellite 20 and the ST 40. The NOCC 28 plays a lesser role. Each ST adjusts its uplink (U/L) transmit power per carrier frequency based on beacon power measurements and satellite feedback (e.g., power measurement of U/L packets). The satellite 20 is, therefore, responsible for maintaining a stable beacon signal over time, and for performing power measurements on U/L packets from the STs.

Figure 2:
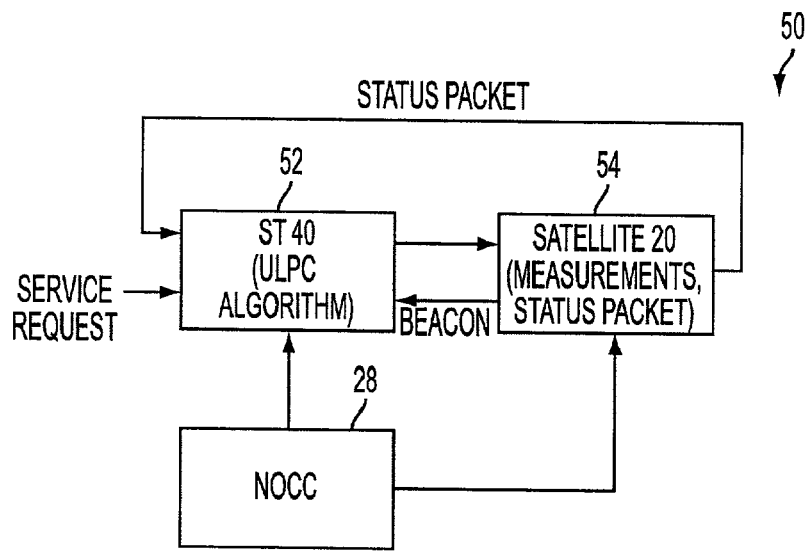
FIG. 2 is a block diagram illustrating interaction of uplink power control system subcomponents in accordance with an embodiment of the present invention.

The interaction among the various ULPC subsystems is shown in FIG. 2. In accordance with the present invention, each ST 40 is preferably provided with an Uplink Power Control (ULPC) algorithm 52 that regulates the ST transmit power to accomplish two objectives. First, the algorithm 52 guarantees an adequate link margin against interference and atmospheric impairments (i.e., satisfy the uplink packet loss rate (PLR) and the power control error (PCE) specifications for the system 10). Secondly, the algorithm 52 compensates for ST and satellite radio frequency (RF) imperfections such as power versus frequency and time variations. The satellite payload is preferably provided with a power control module 54 that performs different measurements using received uplink signals from the STs and generates feedback data comprising a beacon signal and status packets that are used by the ULPC algorithm 52 at the STs to adjust transmit power.

Figure 3:
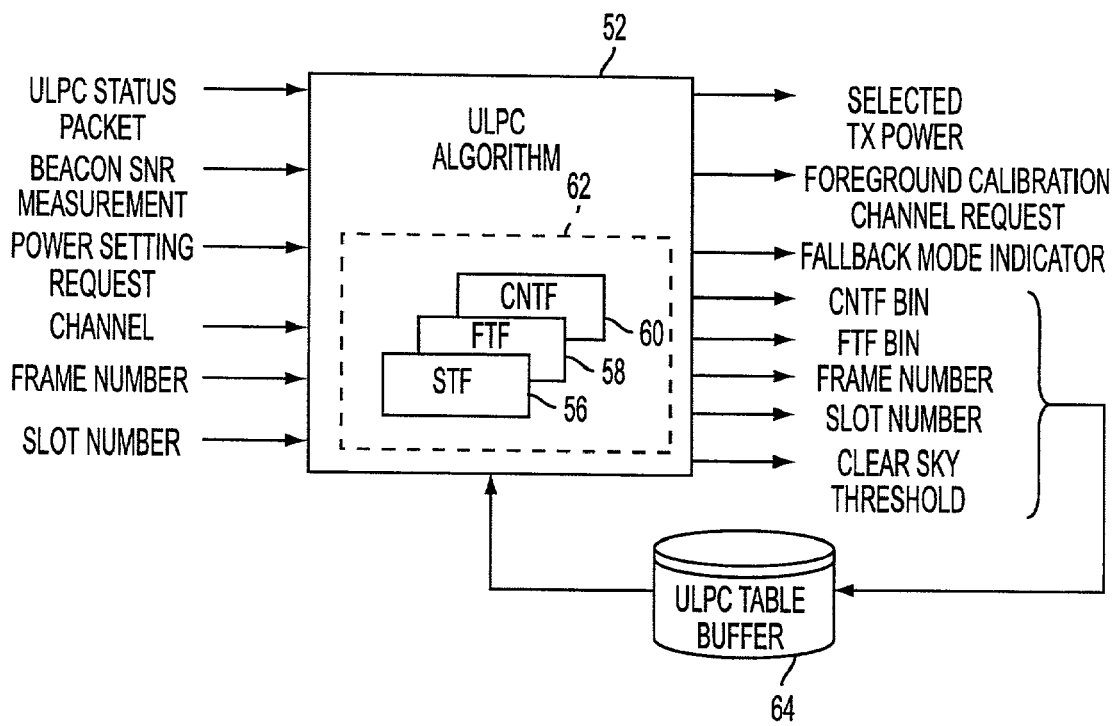
FIG. 3 is a block diagram illustrating an uplink power control algorithm in accordance with an embodiment of the present invention.

The uplink power control (ULPC) algorithm preferably operates as shown in FIG. 3. The algorithm employs a system tracking filter (STF) 56, a frequency table filter (FTF) 58, and a C/N table filter (CNTF) 60. The STF 56 tracks changes in the amplitude of the uplink (U/L) chain spectrum. The U/L chain spectrum jointly describes the ST transmit spectrum and the satellite receive spectrum. The FTF 58 estimates the shape of the U/L chain spectrum. The CNTF 60 estimates the U/L fade from the downlink (D/L) beacon signal-to-noise ratio (SNR) measurements.

The inputs to the ULPC algorithm 52 include a ULPC status packet received from the satellite 20, a beacon signal-to-noise ratio (SNR) measurement derived from the beacon signal received from the satellite, a power setting request generated by the satellite terminal software, and the channel (frequency), frame number, and slot number associated with the impending transmission. Likewise, the outputs of the algorithm 52 comprise the selected transmit (TX) power, a request (when needed) for a foreground calibration channel, and a fallback mode indicator.

Inputs and outputs generated and used within the ULPC algorithm 52 comprise a channel number to index FTF and beacon C/N to indicate CNTF used to compute the transmit (TX) power, a clear sky threshold (e.g., average beacon SNR), and the frame number and slot number associated with the impending transmission. These internal inputs and outputs, together with the feedback from the satellite and the beacon signal-to-noise (SNR) measurement, are used to update the ULPC filter indicated generally at 62 and table buffer 64 in accordance with the present invention.

Figure 4:
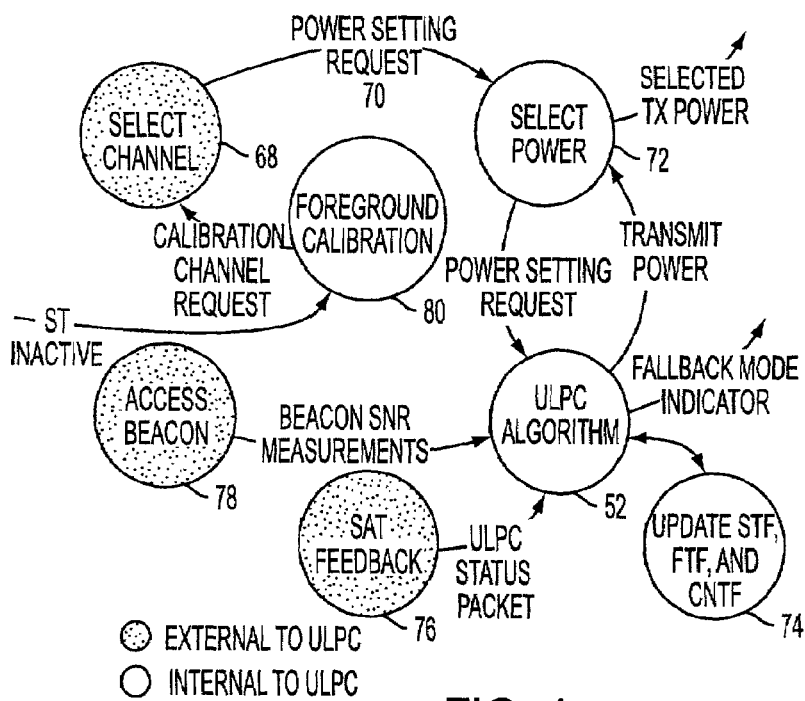
FIG. 4 is a state diagram for an uplink power control system in accordance with an embodiment of the present invention.

A top-level state diagram of the ULPC algorithm 52 is shown in FIG. 4. Once a channel has been identified for use (event 68), a power setting request 70 is made to the ULPC algorithm 52. The algorithm 52 consults the STF 56, the FTF 58, and the CNTF 60 to compute the appropriate uplink TX power (event 72). Periodic beacon SNR measurements (event 78) and satellite feedback (e.g., ULPC status packets) (event 76) are used to update the aforementioned filter and tables (74). The ULPC status packets are also used to determine whether the ST should ingress into or egress out of the fallback mode. Whenever a ST 40 is inactive for a pre-determined length of time, a foreground calibration request (event 80) is issued to track changes in the amplitude of the U/L chain spectrum. A description of these events follows.

With reference to event 78 in FIG. 4, the ST preferably makes beacon SNR measurements every 3 ms. These raw SNR measurements are smoothed with a narrow bandwidth filter to minimize the measurement error and to track the D/L fade. This smoothed value is used to determine a clear sky threshold. The clear sky threshold value is set to the smoothed SNR value if the magnitude of the former is found to be smaller than that of the latter. The raw beacon SNR measurements are also filtered using a second wide bandwidth filter. This averaged SNR value is quantized to select an appropriate CNTF bin to compute the uplink TX power for an impending transmission. ULPC status packets generated at the satellite 20 are cellcast to individual STs 40 preferably every 96 ms. The successful reception and/or the latency of these packets, however, is contingent upon the weather and/or channel impairments and satellite queuing delays. The ULPC status packets comprise the noise floor, the SNR, and the signal-to-noise-and-interference ratio (SINR) measured at the satellite. The packets also comprise an implicit Reed-Solomon (RS) pass/fail indicator, a frame number, and a slot number that correspond to the aforementioned measurements. The contents of each ULPC status packet also correspond to a particular U/L frequency channel.

Figure 5:
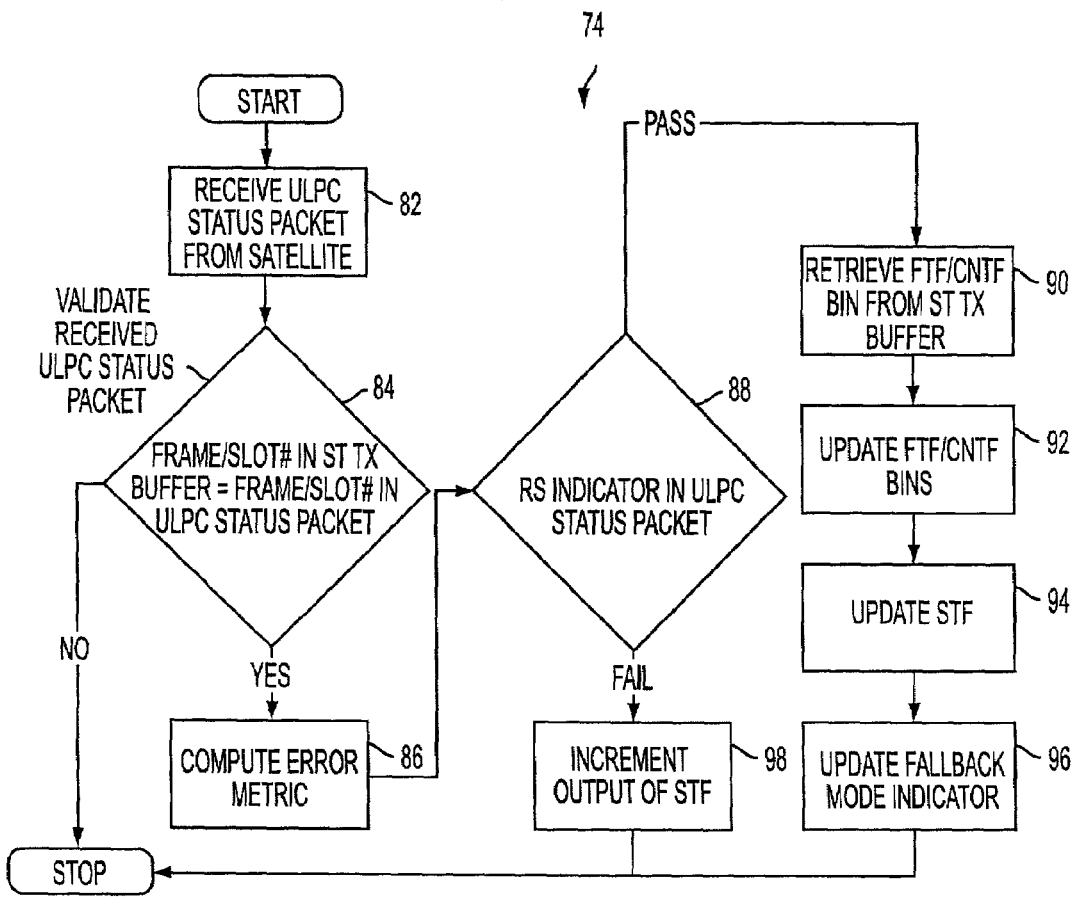
FIG. 5 is a flow chart depicting a sequence of operations for updating ULPC filters in accordance with an embodiment of the present invention.

FIG. 5 depicts a flow chart for ULPC filter and table updates. Upon receiving a ULPC status packet (block 82), the ST computes an error metric by measuring the difference between the SNR value reported in the packet and the target SNR value stored within the ST (block 86). The frame and slot numbers in the ULPC status packet are compared against those stored in an ST's TX buffer. A match indicates that the ULPC packet in question corresponds to a previous transmission. The ULPC table buffer 64 also contains the FTF bin and the CNTF bin used to compute the uplink power for a previous transmission (block 90). If the frame and slot numbers match, and the RS indicator in the ULPC status packet, is implicitly set to pass, then the aforementioned error metric is used to update the FTF and the CNTF bins referred to in the ULPC table buffer 64 (block 92). The FTF 68 is preferably updated only when the smoothed beacon SNR indicates a clear sky condition (i.e., when the absolute difference between the smoothed beacon SNR and the clear sky threshold is less than a predetermined small number. The error metric with the implicit RS pass/fail indicator is also used to update the STF (block 94). An average of the SNR and the SINR reported in the ULPC status packets is computed and used to update the fallback mode indicator (block 96). The RS fail indicator is used to augment the output of the STF by a small, predetermined increment to avoid successive RS failures at the satellite (block 98).

Figure 6:
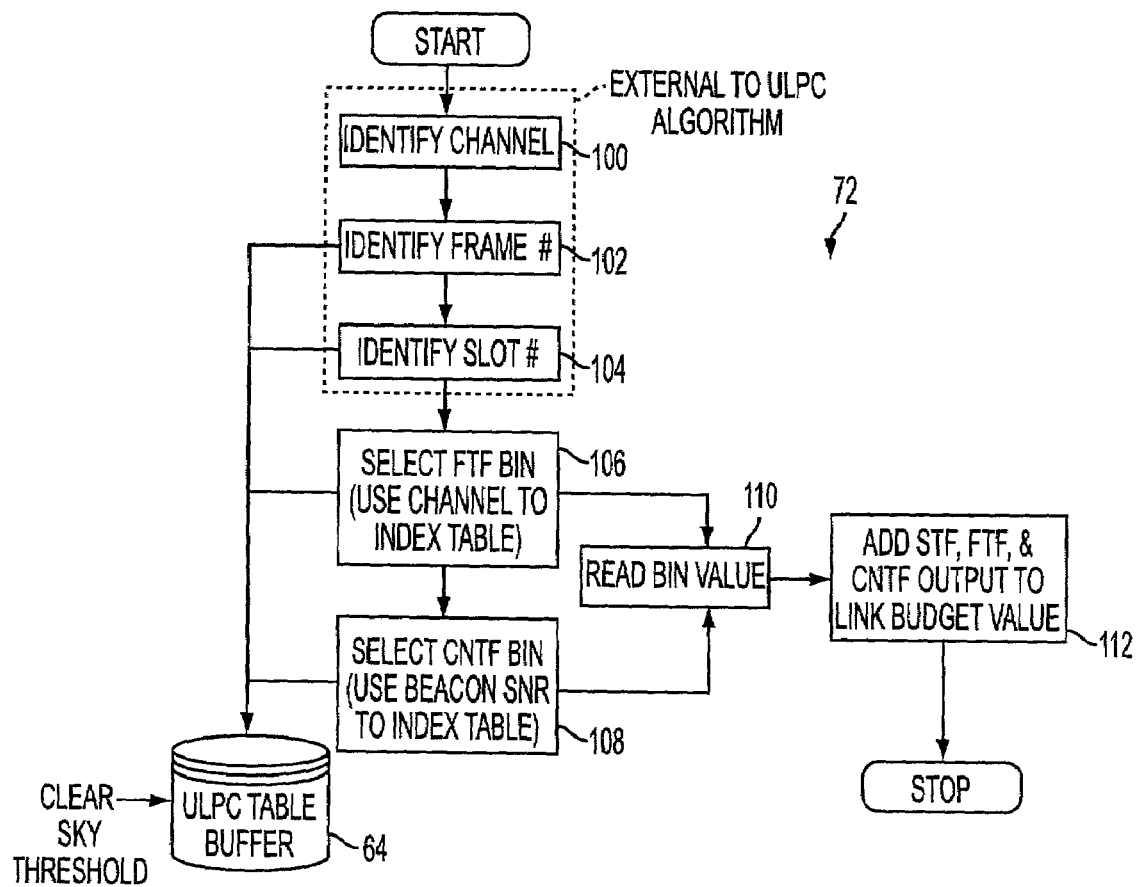
FIG. 6 is a flow chart depicting a sequence of operations for assigning U/L power in accordance with an embodiment of the present invention.

FIG. 6 shows a flow chart for a ULPC power assignment procedure in accordance with the present invention. Once a channel, frame number, and slot number have been identified for a transmission (blocks 100, 102 and 104), the ULPC algorithm 52 computes the uplink TX power by adding the output of the STF 56, the FTF 58, and the CNTF 60 to a pre-determined link budget value (block 112). The output of the STF is its current memory value. The output of the FTF corresponds to the bin associated with the selected channel (blocks 106 and 110). Similarly, the output of the CNTF corresponds to the bin associated with the current quantized, smoothed beacon SNR value (blocks 108 and 110). These two bins, together with the frame number, slot number, and the clear sky threshold, are stored in the ULPC table buffer 64. These stored values are used to authenticate the ULPC status packets (i.e., to verify whether the ST in question was the source of the received ULPC status packet), and are used to update the ULPC filter and tables 62.

Figure 7:
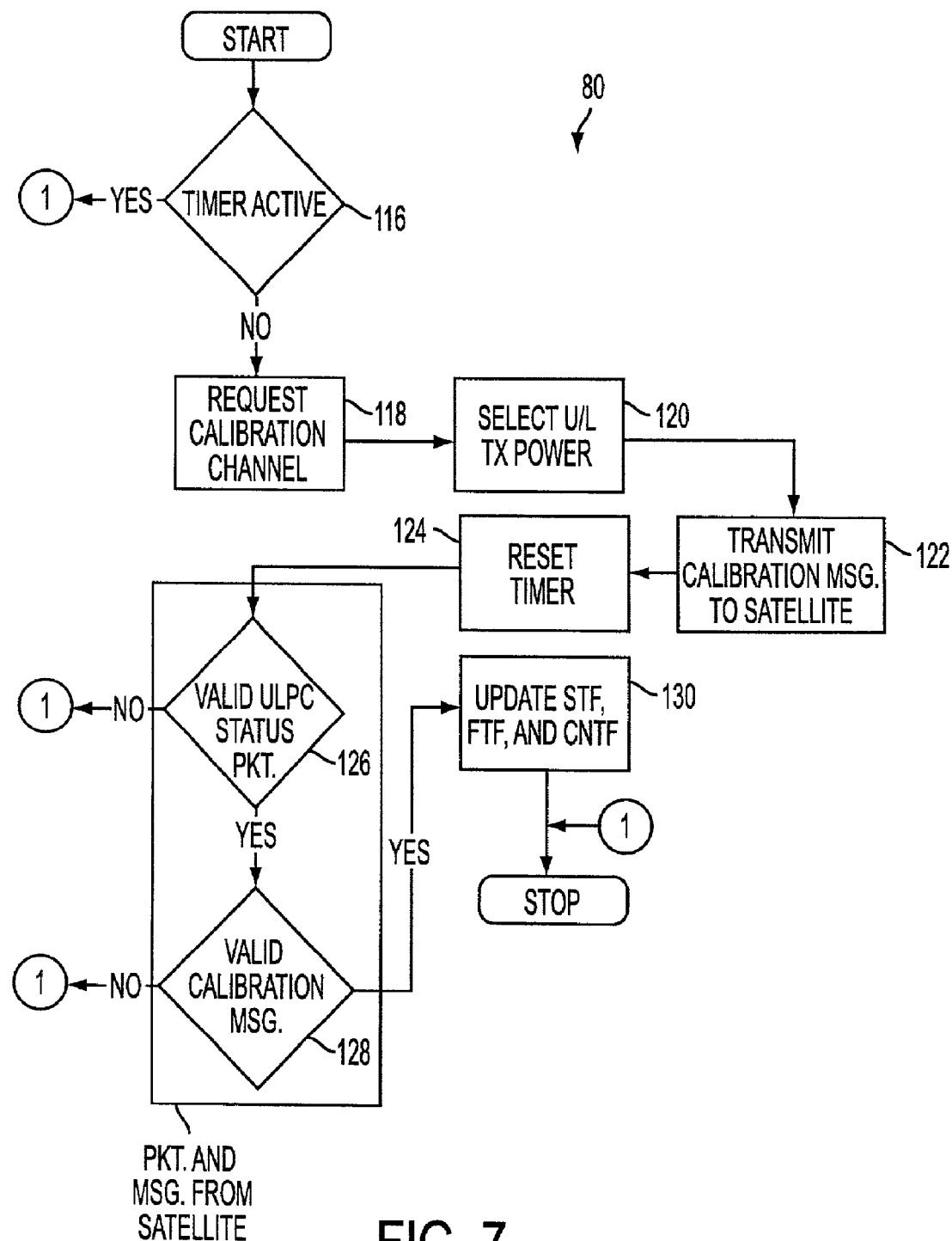
FIG. 7 is a flow chart depicting a sequence of operations for foreground calibration in accordance with an embodiment of the present invention.

FIG. 7 depicts a flow chart for a ULPC foreground calibration procedure in accordance with an embodiment of the present invention. An active ST sets and resets its timeout timer whenever it makes a transmission to a satellite (block 116). However, a period of inactivity (i.e., lack of transmissions) longer than a predetermined period of time (e.g., 10 minutes) causes the ST to issue a foreground calibration request. Foreground calibration updates the ULPC filters and tables while the ST is dormant. The request involves selecting a contention channel (block 118), computing the uplink TX power (block 120), transmitting a self loop-back calibration message (112), and resetting the ST timeout timer (block 124). If a valid ULPC status packet and/or a valid calibration message are not received from the satellite before the timeout timer expires (blocks 126 and 128), then the aforementioned process is repeated. Conversely, if both a valid ULPC status packet and a valid calibration message are received before the timer expires, then the ULPC filter and tables are updated (block 130).

For each U/L transmission, the satellite 20 receives an U/L burst from an ST, makes a series of power measurements, and reports the results of these measurements via cellcast to each ST. These measurements comprise a noise measurement per carrier using the noise estimation period in each U/L frame, a signal-to-noise ratio measurement for each U/L packet received, a block decode metric from which the ST can derive the signal-to-noise-interference ratio (Ec/(No+Io)) using a pre-defined table lookup, and an implicit Reed-Solomon (RS) decoding pass or fail indicator. The NOCC 28 plays a lesser role in the ULPC process. It, however, facilitates the ULPC process by downloading various ULPC parameters to any ST within an U/L cell, configuring the satellite demodulator subbands so as to evenly spread out the contention channels as much as possible, and configuring the satellite PCC so that the ULPC status packets are given the highest priority drop.

Figure 8:
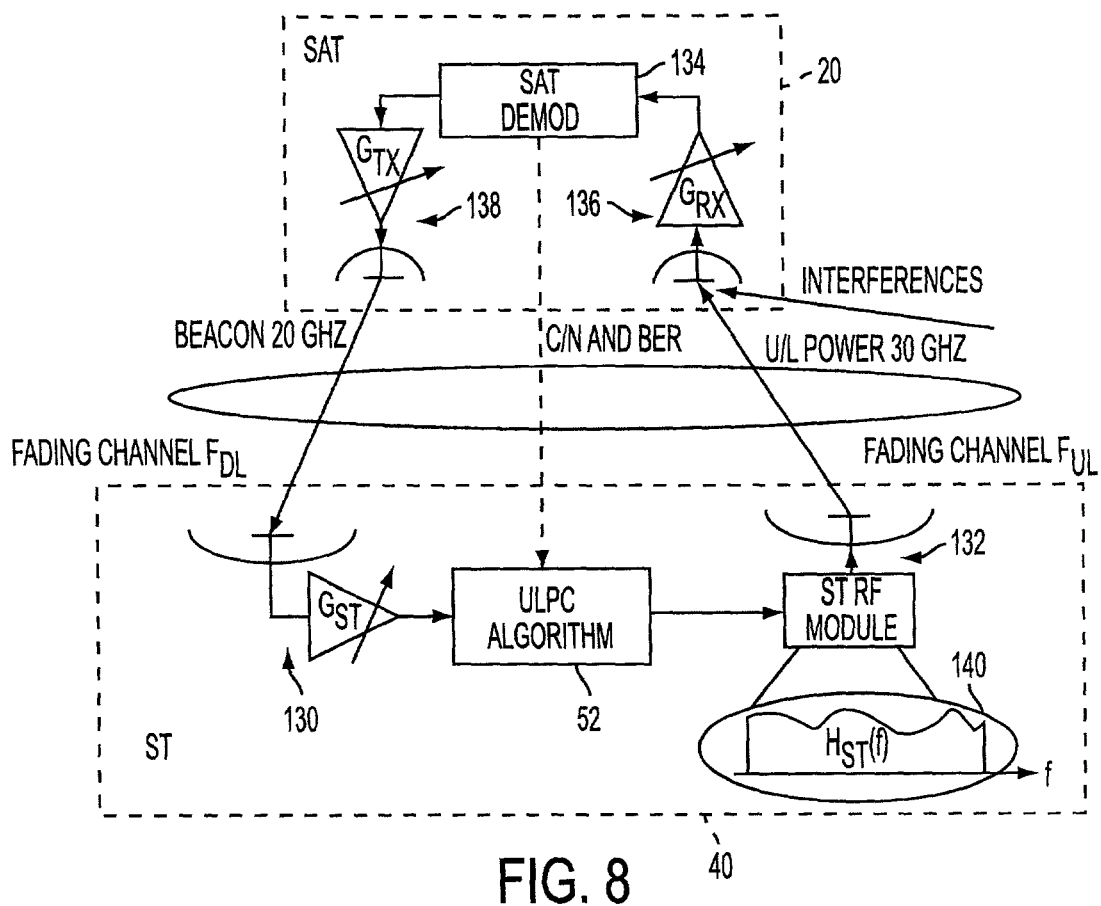
FIG. 8 illustrates a uplink power control system constructed in accordance with an embodiment of the present invention.

FIG. 8 illustrates the ULPC system 50 with system parameters that the ULPC system takes into account. The transmit and receive RF sections 132 and 130, and 138 and 136, respectively, of an ST 40 and the satellite are shown for illustrative purposes, as well as the ULPC algorithm 52 and a satellite demodulator 134. The ST monitors the received beacon slot at each 3 ms D/L frame. The beacon C/N indicates the current channel condition. The ULPC algorithm 52 also receives the ULPC status packet feedback from the satellite for each successful transmission. Using both feedback and beacon C/N measurement, the ULPC compensates the U/L channel fading. On the other hand, the ST transmit (TX) spectrum $H_{ST}(f)$ 140 is unknown to the ULPC algorithm and the satellite receiver gain is time varying. Thus, the overall U/L chain spectrum is unknown and time varying. The ULPC system 50 also needs to estimate and track the U/L chain spectrum such that U/L power across whole bandwidth is equalized.

The following signal models are preferably used for the ULPC: system 50 of the present invention. First, the ST receives (in dB):

1. Signal Power:

$$P_{sig}=G_{ST}+C_0+C_v-F_{DL},$$

Where $C_0$ is the beacon nominal power, $C_v$ is the beacon power variation, $F_{DL}$ is the D/L fade and $G_{ST}$ is the ST receiver gain.

2. Noise power:

$$N_s=F_n+G_{ST}+N_0,$$

where $F_n$ is the noise floor change caused by the fade and $N_0$ is the nominal receiver noise floor.

3. Beacon C/N:

$$C/N=C_0/N_0+C_v-F_{DL}-F_n.$$

The ST transmit EIRP (in dB):

$$P_{ST}=P_{UL}+|H_{ST}(f_c)|,$$

where $H_{ST}(f_c)$ is the ST TX spectrum, $f_c$ is the U/L carrier frequency and $P_{UL}$ is the ULPC setting power.

The satellite receives (in dB):

$$P_{SAT}=G_{RX}(f_c)+P_{ST}-F_{UL}+N+\Sigma I_l,$$

$$=G_{RX}(f_c)+H_{ST}(f_c)+P_{UL}-F_{UL}+\Sigma I_l$$

$$=H(f_c)+P_{UL}-F_{UL}+N+\Sigma I_l$$

where $I_l$ is the interference, $G_{RX}(f)$ is the satellite receive gain, N is the satellite receive noise floor, $F_{UL}$ is the U/L fade and $$H(f)=G_{RX}(f)+H_{ST}(f)$$

is defined as the U/L chain system spectrum. H(f) is unknown and time varying to the ST.

Thermal noise and channel interference contaminate the signal received at the satellite. The satellite preferably continuously monitors signal quality and informs the STs. Each ST adjusts its transmission power such that the expected signal quality is achieved at the satellite. The transmission of U/L power control status packets is preferably accomplished in cellcast mode. The signal quality in the satellite is reported as:

1. Uplink Noise Power (N);
2. Uplink Signal-to-noise-ratio (($C/N)_{SAT}$); and
3, Uplink Bit Error Rate Metric. (Ec/(No+Io)).

The SNR indicates the signal quality in the presence of additive thermal noise only. The BER is a known function of Ec/(No+Io). Thus, the BER Metric indicates signal quality in the presence of the thermal noise and channel interference.

Figure 9:
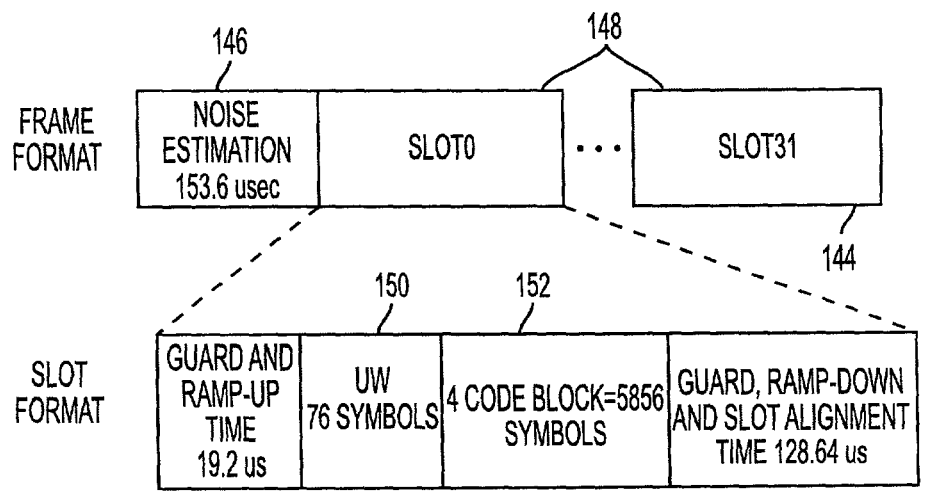
FIG. 9 depicts an uplink frame in accordance with an embodiment of the present invention.

As shown in FIG. 9, each U/L frame 144 has a noise estimation interval where the satellite only receives thermal noise. This noise slot 146 is followed by data slots 148. Each U/L data slot has UW symbols 150 and coded data symbols 152. For example, a 2 Mbps frame and slot format is shown in FIG. 9. Noise power N is estimated over the noise estimation interval 146. The signal power C is estimated over a slot's UW portion 150. The SNR is calculated as $(C/N)_{SAT}$. Coded block data 152 is received with both additive noise and interference. The number of bit errors can be counted at the Hamming block decoder output. The bit error rate (BER) is a function of Ec/(No+Io) (SINR), where Io is the interference power. If the SINR and block decoding BER relationship is known, the SINR can be calculated based on the number of bit errors at the block decoder output.

The payload 21 preferably makes 24, 2 Mbps noise measurements per demodulator 134. The noise measurement is performed after a channelizer filter (sqrt-Nyquist filter with 40% excess BW). The payload 21 power control module 54 preferably comprises a noise and signal estimator modules (e.g., software components for the PCC).

The noise estimator module uses an absolute value operation to estimate the noise standard deviation: For a $N(0,\sigma_n)$, complex noise sample is:

$$n(k) = n_I(k) + j \cdot n_Q(k)$$

The noise standard deviation can be measured by:

$$\hat{\sigma}_n = \frac{\sqrt{\pi/2}}{2N} \sum_{k=0}^{N-1} [|n_I(k)| + |n_Q(k)|]$$

where N is the number of noise samples.

For FDMA carriers operating in the 128 or 512 kbps mode, the uplink noise sample corresponds to the uplink noise over the 2 Mbps FDMA carrier bandwidth that overlaps the FDMA carrier or carriers being acknowledged. For FDMA carriers operating in the 2 Mbps mode, the noise sample corresponds to the uplink noise sampled over the bandwidth of the FDMA carrier being acknowledged. For FDMA carriers operating in the 16 Mbps mode, the noise sample subfield corresponds to the uplink noise samples collected over the bandwidth of the eight 2 Mbps FDMA carriers contained within the 16 Mbps FDMA carrier being acknowledged.

The signal estimator module cross-correlates the received UW 150 with a stored version of the UW. The magnitude of this cross-correlation is proportional to the incoming signal's amplitude (not power). Let x(i) the stored UW (i=1 to N, N is the UW length). The complex received signal is given by:

$$r(i) = Ax(i)e^{j\phi} + n(i)$$

where A is the signal amplitude, $\phi$ is the phase, and n(i) is the uncorrelated noise samples. The cross-correlation is given by:

$$R(0) = \sum_i r(i) * x(i)$$

$$= \sum_i A|x(i)|^2 e^{j\phi} + \text{noise}$$

An estimate of the signal amplitude is given by taking the absolute value of R(0). This is a biased estimator, but the bias is small if the SNR is large. For example, the bias is approximately 0.02 dB of Ec/No with N=52 symbol UW at the SNR=17 dB. The SNR can be calculated based on the estimated noise variance and the signal amplitude. The SNR estimate is the signal amplitude estimate divided by the noise estimate. The satellite reports back the SNR measurement to STs in a ULPC status packet.

At the satellite, the received C/N is $$\left(\frac{C}{N}\right)_{SAT} = P_{UL} - F_{UL} + H(f) - N_{SAT}$$

where $$\left(\frac{C}{N}\right)_{SAT}:$$

satellite received C/N and $P_{UL}$: ST U/L power $F_{UL}$: U/L fade

H(f): U/L chain spectrum including satellite G/T and ST transmitter power spectrum.

$N_{SAT}$: satellite receiver noise.

Figure 10A:
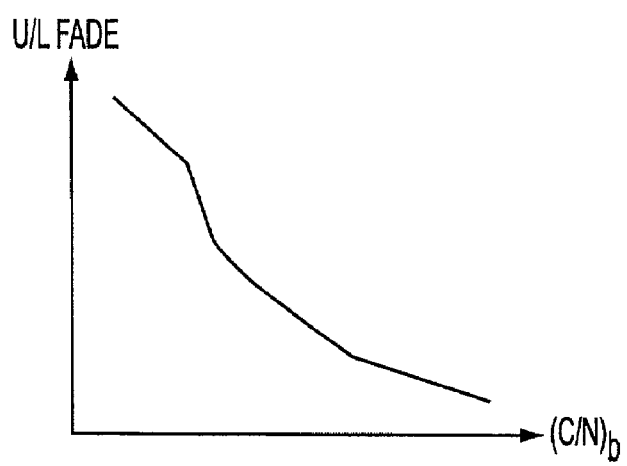
FIGS. 10A and 10B illustrate, respectively, uplink fade and uplink spectrum profile in accordance with an embodiment of the present invention.
Figure 10B:
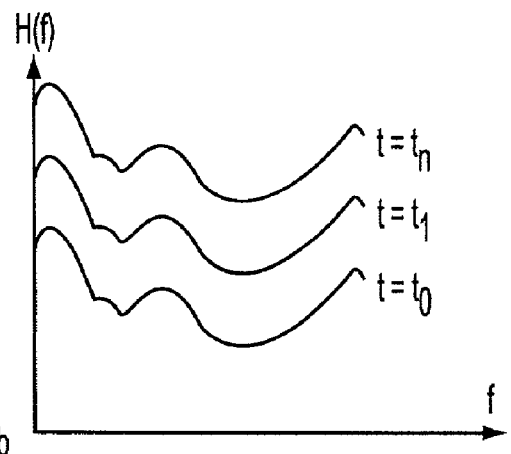

The U/L fade and the D/L beacon C/N profile is shown in FIG. 10A. This figure reflects a long time averaged D/L C/N and U/L fade slope. Since the slope is only an averaged one, the U/L fade is not necessarily equal to the beacon (C/N) times a scaling factor at each instantaneous time due to the U/L and D/L de-correlation. An U/L spectrum profile is shown in FIG. 10B. The spectrum shape is unknown but unchanged, and only the spectrum amplitude changes with time.

Based on the satellite feedback and beacon $$\left(\frac{C}{N}\right)_b,$$

the ULPC algorithm 52 preferably derives following metrics to control its U/L power:

1) U/L fade estimation $P_{C/N}$ to compensate the U/L fade $F_{UL}$
2) U/L spectrum shape estimation $P_f$ to equalize the U/L spectrum $H(f)$; and
3) U/L system variation estimation $P_s$ to track the system variation $dH(f)$.

In accordance with a closed loop approach, the U/L power is set by these three metrics as:

$$P_{UL} = P_{C/N} - P_f - P_s$$

Preferred (e.g., essentially perfect) power control is when $$P_{C/N} = F_{UL} + \left(\frac{C}{N}\right)_{Target} \text{ and}$$

$$P_f + P_s = H(f)$$

for all carrier frequencies at any time such that the received C/N at the satellite is $$\left(\frac{C}{N}\right)_{SAT} = P_{UL} - F_{UL} + H(f)$$
$$= P_{C/N} - F_{UL} - P_f - P_s + H(f)$$
$$= \left(\frac{C}{N}\right)_{Target}$$

The C/N table $P_{C/N}$ reflects the long-term statistics between D/L C/N and U/L fade. The frequency table $P_f$ equalizes the U/L chain spectrum shape (fixed) and $P_s$ tracks system variation. Since the ULPC PCE is greater in poor weather conditions, the C/N target $$\left(\frac{C}{N}\right)_{Target}$$

can be raised to achieve required PLR.

Figure 11:
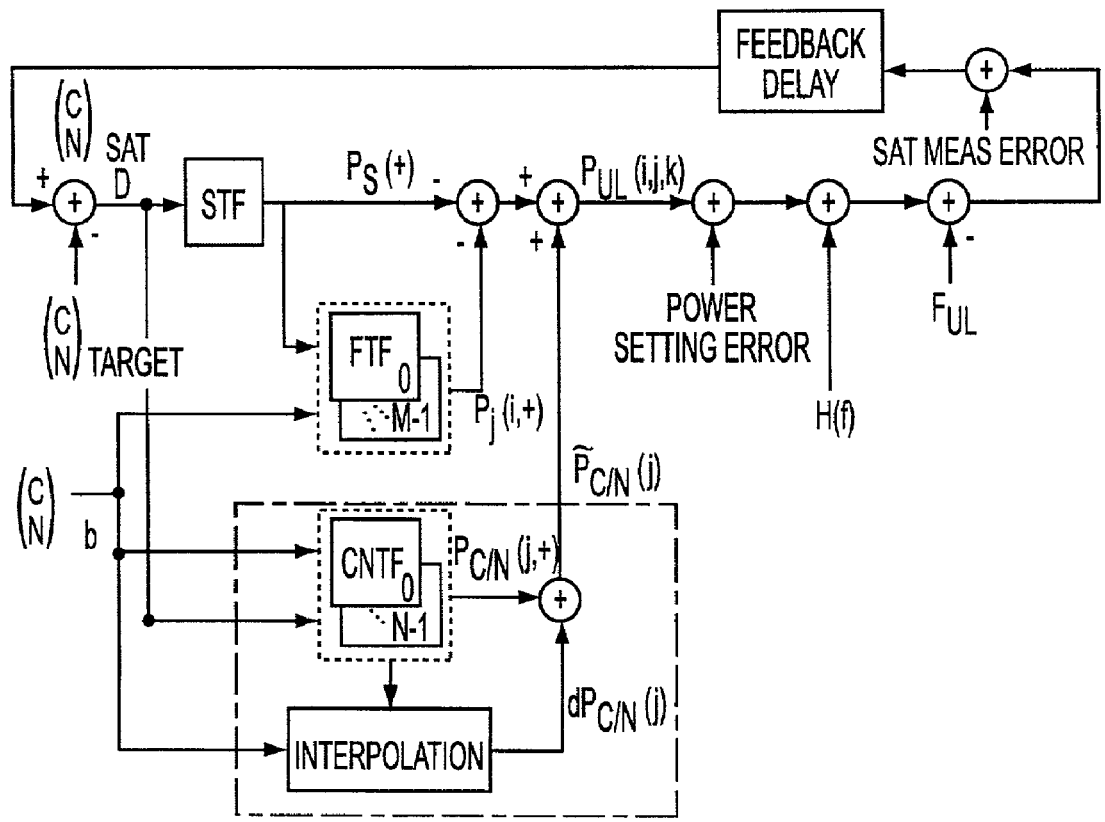
FIG. 11 is a block diagram depicting a closed-loop ULPC algorithm in accordance with an embodiment of the present invention.

A closed-loop ULPC algorithm 52 based on satellite feedback and beacon C/N is shown in FIG. 11. The closed-loop preferably consists of the following three filters:
System Tracking Filter (STF): $P_s$;
Frequency Table Filter (FTF): $P_f$; and
C/N Table Filter (CNTF): $P_{C/N}$.

The U/L power is constructed from three filter outputs as:

$$P_{UL}(i,j,k) = P_{C/N}(j,+) - P_s(+) - P_f(i,+)$$

These filters are discussed in more detail below.

The STF tracks the system variation ($dH(f)$). The STF is shared by all frequency bins and all beacon C/N bins. It is updated any time when there is a feedback received. The STF output $P_s(+)$ is updated as:

$$P_s(+) = P_s(-) + \Delta_s \cdot D \ldots \text{RS pass}$$
$$= P_s(-) - RS\_M\arg\text{in} \ldots \text{RS fail}$$

where
D: Error metric:

$$D = \left(\frac{C}{N}\right)_{SAT} - \left(\frac{C}{N}\right)_{Target};$$

$P_s(-)$: last STF output;
$\Delta_s$: step constant (0.1); and
RS_Margin: additional margin.

The FTF is used to estimate the U/L spectrum shape (H(f)). The U/L spectrum is divided into M frequency bins. There are M low pass filters (LPF) in a FTF for M frequency bins. The spectrum shape is estimated only when in clear sky, or $$\left|\left(\frac{C}{N}\right)_b - \left(\frac{C}{N}\right)_{ref}\right| < Th$$

where $$\left(\frac{C}{N}\right)_b$$

is the averaged beacon C/N, $$\left(\frac{C}{N}\right)_{ref}$$

is the beacon reference C/N and Th is the threshold (0.25 dB). When beacon C/N is within reference region, the FTF is updated for each frequency bin i associated with the feedback:

$$P_f(i,+) = P_f(i,-) + \Delta_f \cdot P_s(+)$$

where
$P_f(i,+)$: current FTF output at bin i;
$P_f(i,-)$: last FTF output at bin i; and
$\Delta_f$: FTF step constant (0.01).

Both STF and CNTF use same error metric D as input, there is a possible DC component build-up caused by numerical error. DC component is estimated as:

$$DC(+) = \beta_s \cdot DC(-) + (1 - \beta_s) \cdot P_s(+)$$

where $\beta_s$ is a filter parameter (0.999).
If the DC component is large enough, i.e.

$$|DC(+)| > Th\_DC,$$

DC component is removed from STF and CNTF output:

$$P_s(+) = P_s(+) - DC(+),$$
$$P_s(-) = P_s(+)$$
$$P_{C/N}(j,+) = P_{C/N}(j,+) - DC(+),$$

for all C/N bin j $$P_{C/N}(j,-) = P_{C/N}(j,+)$$
$$DC(+) = DC(-) = 0$$

The beacon C/N is divided into N C/N bins. There are N low pass filters (LPFs) in a CNTF for N beacon C/N bins. For each beacon C/N bin j, the CNTF is updated as:

$$P_{C/N}(j,+) = P_{C/N}(j,-) - \Delta_{C/N} \cdot D$$

where $P_{C/N}(j,-)$: last CNTF filter output at bin j; and $\Delta_{C/N}$: step constant.

The CNTF output $P_{C/N}(j,+)$ is the U/L fade corresponding to the D/L fade at the C/N bin center. For the D/L fade other than at C/N bin center, the U/L fade correction $dP_{C/N}(j)$ is interpolated based on $P_{C/N}(j+1,+)$, $P_{C/N}(j,+)$, $P_{C/N}(j-1,+)$ and $$\left(\frac{C}{N}\right)_b.$$

The U/L fade estimation at beacon C/N of $$\left(\frac{C}{N}\right)_b$$

is:

$$\tilde{P}_{C/N}(j) = P_{C/N}(j,+) + dP_{C/N}(j).$$

For an U/L transmission, the U/L power is the function of time (slot number k), frequency (frequency bin i) and beacon C/N (beacon bin j). The U/L power is set as:

$$P_{UL}(i,j,k) = \tilde{P}_{C/N}(j) - P_s(+) - P_f(i,+)$$

$$= P_{C/N}(j,+) + dP_{C/N}(j) - P_s(+) - P_f(i,+)$$

Power Control Error (PCE) is defined at the satellite 20 as:

$$PCE = \left(\frac{C}{N}\right)_{SAT} - \left(\frac{C}{N}\right)_{Target}$$

$$= P_{C/N}(j,-) - P_s(+) - P_f(i,+) - F_{UL} + H(f) - \left(\frac{C}{N}\right)_{Target}$$

$$= \left(P_{C/N}(j,-) - F_{UL} - \left(\frac{C}{N}\right)_{Target}\right) + (H(f) - P_f(i,+) - P_s(+))$$

A ULPC algorithm is preferably implemented for all traffic channels. After a ULPC status packet is received and it is considered as valid, the ULPC algorithm preferably performs identically for all traffic channels. The traffic channels and their interaction with the ULPC algorithm are shown in Table 1.

TABLE 1

U/L Traffic Channels and ULPC Algorithm Interaction

| Traffic Type | Description | Interaction with ULPC |
|---|---|---|
| Control Contention Channel | 512/128 Kbps, a random carrier frequency is selected from the list of available contention channels | The ST receives ULPC status packet and bandwidth on demand (BoD) grant from the satellite. The C/N is used by the ULPC algorithm when the BoD request is confirmed and RS is passed. |
| Data Contention Channel | 512/128 Kbps, a random carrier frequency is selected from the list of available contention channels | The ST receives ULPC status packet from the satellite. The C/N is used by the ULPC algorithm when the RS decoding is passed. |
| Foreground Calibration via Contention Channel | 512/128 Kbps, a random carrier frequency is selected from the list of available contention channels | The ST sends the ULPC Calibration Message on contention channel when the ST is idle for a long time (10 minutes). The ST receives ULPC status packet from the satellite. The C/N is used by the ULPC algorithm when the RS decoding is passed. |
| Volume Channel | 512/128 Kbps, 2 Mbps and 16 Mbps, the carrier frequency is dynamically selected by the PCC on the satellite | The ST receives ULPC status packet from the satellite. The C/N is used by the ULPC algorithm when the RS decoding is passed. |
| Rate Channel | 512/128 Kbps, 2 Mbps and 16 Mbps, the carrier frequency is dynamically selected by the PCC on the satellite or the NOOC | The ST receives ULPC status packet from the satellite. The C/N is used by the ULPC algorithm when the RS decoding is passed. |

The U/L power control is based on the D/L beacon measurement and satellite feedback packets. The closed-loop follows same procedures for all contention or traffic channels. Therefore the closed-loop control is identical to all channels.

When there is a transmission at time k, the U/L power $P_{UL}(i,j,k)$ is set according to STF, FTF and CNTF output. A frequency bin is preferably shared by one 2 Mbps carrier or four 512 Kbps carriers. A 16 Mbps channel uses eight frequency bins within its bandwidth. On the other hand, CNTF table is built based on the 512 Kpbs channel. In order to achieve about same C/N target at the satellite, a margin needs to be added to the U/L power. As the result, the U/L power is set as:

if data rate is 16 Mbps $$P_{UL}(i,j,k) = P_{C/N}(j,+) + dP_{C/N}(j) - P_s(+) - \frac{1}{8} \cdot \sum_{ii=0}^{7} P_f(i+ii,+) + \text{Mode\_offset} + \text{Var\_margin}(j),$$

else $$P_{UL}(i,j,k) = P_{C/N}(j,-) + dP_{C/N}(j) - P_s(+) - P_f(i,+) + \text{Mode\_offset} + \text{Var\_margin}(j)$$

where i is the frequency bin for current transmission (i is the first bin of eight for a 16 Mbps transmission), j is the current beacon bin $$j = \left\lfloor \frac{\left|\left(\frac{C}{N}\right)_{max} - \left(\frac{C}{N}\right)_b\right|}{bin\_size} + 1/2 \right\rfloor$$

and Mode_offset is a power offset for different date rate traffic as shown in Table 2. Higher data rate traffic requires a wider receiver bandwidth at the satellite, hence receives higher noise power. In order to achieve same received C/N at the satellite, a power offset is added to the ST transmission power.

TABLE 2

Maximum Power and offset for the different Mode

| Mode | Offset |
|---|---|
| 128 Kbps | 0 dB |
| 512 Kbps | 0 dB |
| 2 Mbps | 6.02 dB |
| 16 Mbps | 15.05 dB |

Figure 12:
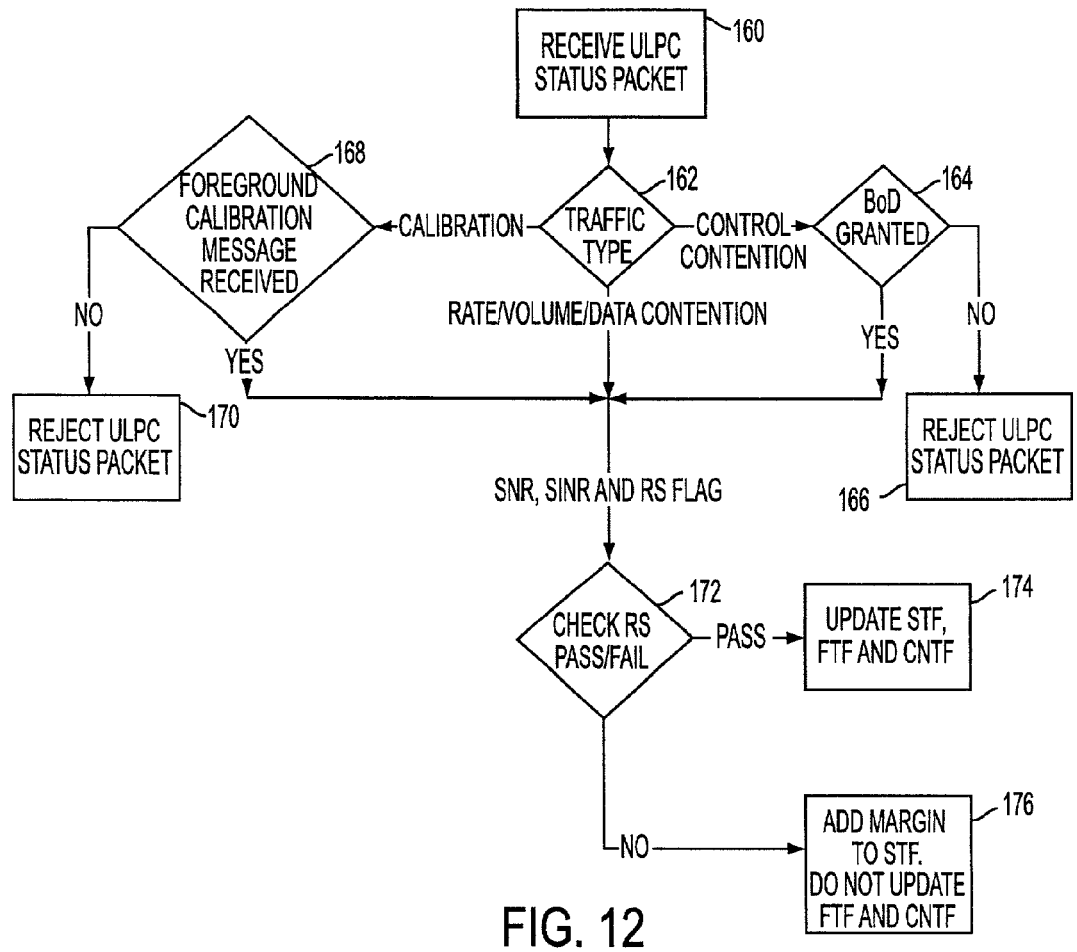
FIG. 12 is a flow chart depicting a sequence of operations for processing ULPC status packets in accordance with an embodiment of the present invention.

FIG. 12 is a flow chart depicting ULPC status packet handling for terminal uplink power control. The ULPC status packet is received for every ST transmission (block 160). The ULPC status packet is processed according to its channel type (block 162). For example, different channel types can be:

Control Contention Channel: The ULPC status packet is considered valid only when BoD is granted for this ST (blocks 164 and 166);

Foreground Calibration via Contention Channel: The ULPC status packet is considered valid only when a ULPC Foreground Message is received (blocks 168 and 170);

Rate/Volume/Data Contention Channel: The ULPC status packet for these channels is considered as valid for the ULPC algorithm. In the data contention channel, when a ULPC Status packet is received, there is no guarantee that the data with the packet is valid for that ST, even if the RS passes. This is due to the fact that a collision may have occurred and that another ST was able to successfully transmit on the same frame, slot and frequency. When such an event occurs, the frequency table may be updated by the wrong information. This event is rare and thus should not add any additional error on the frequency table. It is preferable to accept this minimal error to the frequency tables than not use the data contention channel information at all.

When the ULPC algorithm 52 receives the ULPC status packet, it updates the STF, FTF and CNTF if RS is passed (blocks 172 and 174); otherwise, a fixed power margin is added to the STF to increase the U/L power for next few transmissions (block 176). The calibration message referred to in block 168 and the BoD grant referred to in block 164 preferably arrive within selected timeout periods.

An example of the operation of the ULPC algorithm in the ST is shown in Table 3. This table illustrates how the ST operates for different traffic types on each frame and how the various filters in the closed loop get updated.

TABLE 3

Example of ULPC Algorithm Operation.

| Frame No | ST-TX $P_{UL}(i,j,k)$ | ST-RX | Update CNTF | Update FTF[1] | Update STF | Comment |
|---|---|---|---|---|---|---|
| 1 | $P_{UL}(5,10,1)$ | | | | | Start of Volume transmission. Transmit on freq bin 5; C/N bin 10 and frame #1. |
| 2 | $P_{UL}(5,10,2)$ | | | | | Continue volume transmission. |
| 3 | $P_{UL}(5,11,3)$ | | | | | D/L beacon has changed due to fade or beacon variation |
| 4 | $P_{UL}(5,11,4)$ | SP(1) | $P_{C/N}$ (10) | $P_f(5)$ | Yes | ULPC Status Pkt (SP(k))received for frame 1, assumes the roundtrip delay is 4 frames. End of Volume transmission |
| 5 | | SP(2) | $P_{C/N}$ (10) | $P_f(5)$ | Yes | RS passed, Update the CNTF bin 10, the STF and the FTF bin 5 since the C/N bin >= clear sky threshold. |
| 6 | $P_{UL}(12,9,6)$ | SP(3) | $P_{C/N}$ (11) | $P_f(5)$ | Yes | Send a control contention channel (BoD Request) transmission |
| 7 | | SP(4) | $P_{C/N}$ (11) | $P_f(5)$ | Yes | |
| ... | | | | | | |
| 12 | $P_{UL}(15,10,12)$ | SP(6) | | | | Received Status Pkt for contention ch TX, assumes the roundtrip delay is 6 frames. Send a data contention channel trans. |

TABLE 3-continued

Example of ULPC Algorithm Operation.

| Frame No | ST-TX $P_{UL}(i,j,k)$ | ST-RX | Update CNTF | Update FTF[1] | Update STF | Comment |
|---|---|---|---|---|---|---|
| 13 | | BoD grant rec. | $P_{C/N}(9)$ | | Yes | BoD Grant validates the Status Pkt contents, RS passed now update CNTF and STF. FTF is not updated since C/N bin < clear sky threshold. |
| ... | | | | | | |
| 17 | | SP(12) | $P_{C/N}$ (10) | $P_f(15)$ | Yes | Received the status pkt for data cont ch, RS passed, update CNTF, STF and FTF. |
| ... | | | | | | |
| 92 | $P_{UL}(15,1$ $2,92)$ | | | | | 10 mins have passes without any transmission. ST sends a foreground calibration message |
| ... | | | | | | |
| 96 | | SP(92) | | | | Received Status Pkt for calibration message |
| 97 | | | | | | |
| 98 | | Calib msg rec | $P_{C/N}$ (12) | $P_f(15)$ | Yes | Received the self addressed calibration message, RS passed, update CNTF, STF and FTF. |

[1]FTF is updated only for clear sky. For this example assume that clear sky is present if the C/N bin is greater than or equal to 10.

In order to track the system variation (e.g., ST temperature variation and satellite G/T variation), foreground calibrations are sent by each ST through the contention channel if there is no transmission for a long time. The foreground calibration is triggered by the ULPC algorithm 52 preferably if, and only if, there is no transmission for a selected period of time (e.g., 10 minutes).

Fallback (FB) mode is used to increase the availability provided to certain satellite commmunication system 10 customers by reducing the ST uplink data rate during times of heavy rain. The reduced data rates are preferably 2 Mbps reduced to 512 Kbps; and 512 Kbps reduced to 128 Kbps.

The ULPC algorithm requests a switch to enter into and exit from the fallback (FB) mode based the ULPC status packet. In order to reduce FB mode false detection rate, the received $$\left(\frac{C}{N}(k)\right)_{SAT}$$

and $$\left(\frac{E_0}{N_0+I_0}(k)\right)_{SAT}$$

are filtered first:

$$\left(\frac{C}{N}(+)\right)^{ave}_{SAT} = \mu_{SNR} \cdot \left(\frac{C}{N}(-)\right)^{ave}_{SAT} + (1-\mu_{SNR}) \cdot \left(\frac{C}{N}(k)\right)_{SAT}$$

$$\left(\frac{E_0}{N_0+I_0}(+)\right)^{ave}_{SAT} = \mu_{SINR} \cdot \left(\frac{E_0}{N_0+I_0}(-)\right)^{ave}_{SAT} + (1-\mu_{SINR}) \cdot \left(\frac{E_0}{N_0+I_0}(k)\right)_{SAT}$$

where $\mu_{SNR}$ and $\mu_{SINR}$ are filter constant for N $$\left(\frac{C}{N}(k)\right)_{SAT}$$

and $$\left(\frac{E_0}{N_0+I_0}(k)\right)_{SAT}$$

respectively.

Figure 13:
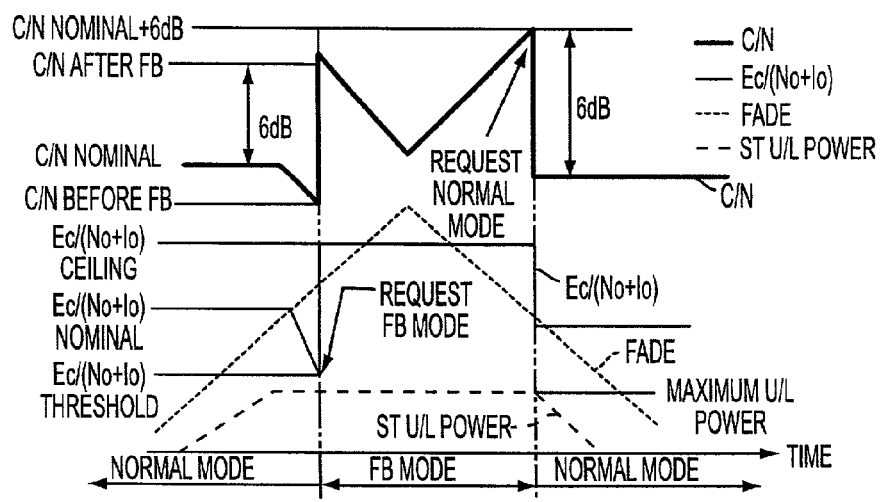
FIG. 13 illustrates a relationship between a fallback mode and transmit power in accordance with an embodiment of the present invention.

The Normal mode to FB mode switch preferably depends only on the satellite feedback $$\left(\frac{E_0}{N_0+I_0}(+)\right)^{ave}_{SAT}$$

and not on the beacon C/N. FIG. 13 illustrates the ULPC/FB interactions, along with the signal quality, fade and the ST U/L power. As the fade increases, the ST U/L transmit power increases until it reaches its maximum power. Until then, the Ec/(No+Io) at the satellite 20 is maintained at the nominal level, after which it decreases as the fade increases.

$$\left(\frac{E_0}{N_0+I_0}(+)\right)^{ave}_{SAT}$$

plays an important role in determining when to switch to the FB Mode since it is desirable to maintain the PLR during the rainy fade condition. Thus, when $$\left(\frac{E_0}{N_0+I_0}(+)\right)^{ave}_{SAT}$$

drops from Ec/(No+Io) nominal to a Ec/(No+Io) threshold, the normal mode is switched to the fallback mode. When in the normal mode, the ULPC algorithm 52 sends a FB request if:

$$\left(\frac{E_0}{N_0+I_0}(+)\right)^{ave}_{SAT} < \left(\frac{E_0}{N_0+I_0}\right)_{Threshold}, \text{ and}$$

$$P_{UL}(i,j,k)+P_f(i,+) \geq P_{max}.$$

In order to avoid more U/L packet loss, the ST switches to the FB quickly. A smaller filter constant $\mu_{SINR}$ is be chosen.

When the ST operates in the FB rate mode, it is likely that the feedback Ec/(No+Io) is saturated as shown in FIG. 13. The FB exit should therefore rely on the $(C/N)_{SAT}$ feedback. Since FB mode is operating in rainy conditions, the fade changes rapidly and the satellite may receive $(C/N)_{SAT}$ which fluctuates with rain fade. Thus, the mode switch from the fallback to the normal needs to be taken more cautiously. A larger filter constant $\mu_{SNR}$ is chosen ($\mu_{SNR}$=0.9, number of feedback averaged is about 10). The switch to the normal mode is made when $$\left(\frac{C}{N}(+)\right)^{ave}_{SAT}$$

is higher than the $(C/N)_{SAT}$ ceiling ($(C/N)_{SAT}$ nominal+6 dB for a 2 Mbps channel). When in FB mode, the ULPC sends a FB Mode Off request if:

$$\left(\frac{C}{N}(+)\right)^{ave}_{SAT} > \left(\frac{C}{N}\right)_{Ceiling}$$

Although the present invention has been described with reference to a preferred embodiment thereof, it will be understood that the invention is not limited to the details thereof. Various modifications and substitutions will occur to those of ordinary skill in the art. All such substitutions are intended to be embraced within the scope of the invention as defined in the appended claims.

What is claimed is:

1. An uplink power control system for terminals in a satellite communication system comprising:
a satellite terminal operable to transmit uplink signals to and receive downlink signals from a satellite and comprising a programmable processing device, said downlink signals comprising feedback power data generated at said satellite in response to said uplink signals; and
a power control module operating with said processing device to adjust transmit power for said uplink signals in accordance with said feedback power data, wherein said power control module maintains and updates data relating to the uplink spectrum and adjusts said transmit power using said data;
wherein said downlink signals comprise a beacon signal, said power control module being operable to determine carrier to poise or C/N data using said beacon signal, to maintain and update fade data relating to estimated uplink fade using said C/N data, and wherein said spectrum data comprises the satellite terminal transmit spectrum and the satellite receive spectrum, said power control module adjusting said transmit power using said fade data and said spectrum data; and
wherein said downlink signal comprises an uplink power control status packet generated at said satellite for said terminal, said status packet comprising signal to noise ratio data corresponding to a frequency channel in said satellite communication channel on which said uplink signals are being transmitted, and further comprising a storage device for storing a plurality of filter tables for storing said fade data and said spectrum data, said power control module being operable to update said filter tables when said status packet is received.

2. A method for performing uplink power control for terminals in a satellite communication system comprising the steps of:
assigning a communication channel to a terminal for transmitting an uplink signal to a satellite, wherein said uplink signal includes data relating to the uplink spectrum;
processing said uplink signals at said satellite to obtain signal to noise data and spectrum data corresponding to said communication channel;
generating a feedback signal corresponding said processed uplink signal on said channel;
transmitting said feedback signal to said terminal; and
adjusting transmit power at said terminal in accordance with said feedback signal and updating spectrum data;
wherein said generating step comprises the steps of determining at least one of noise, signal-to-noise ratio and signal-to-noise and interference ratio of one of said uplink signals at said satellite, generating a status signal indicating at least one of noise, signal-to-noise ratio and signal-to-noise-interference ratio corresponding to said uplink signal, and transmitting said status signal to said terminal, said status signal being used by said terminal to determine said transmit power; and
wherein said terminal transmits said uplink signals at a selected data rate, and further comprising the step of determining whether said terminal should enter a fallback mode during which said terminal transmits said uplink signals at a lower data rate depending on said status signal.

3. A method for performing uplink power control for terminals in a satellite communication system comprising the steps of:
assigning a communication channel to a terminal for transmitting an uplink signal to a satellite, wherein said uplink signal includes data relating to the uplink spectrum;
processing said uplink signals at said satellite to obtain signal to noise data and spectrum data corresponding to said communication channel;
generating a feedback signal corresponding said processed uplink signal on said channel;
transmitting said feedback signal to said terminal; and
adjusting transmit power at said terminal in accordance with said feedback signal and updating spectrum data;
wherein said terminal transmits said uplink signals at a selected data rate, and further comprising the step of determining whether said terminal should enter a fallback mode during which said terminal transmits said uplink signals at a lower data rate when said feedback signal indicates excess attenuation due to rain.

4. A method as claimed in claim 3, wherein said terminal quits said fallback mode and resumes transmitting said uplink signals at a higher data rate than said lower data rate when said feedback signal no longer indicates said attenuation.

* * * * *